United States Patent
Oshige

(10) Patent No.: US 10,634,827 B2
(45) Date of Patent: Apr. 28, 2020

(54) ELECTRONIC VIEWFINDER, IMAGE CAPTURING APPARATUS, AND DISPLAY MODULE

(71) Applicant: CANON KABUSHIKI KAISHA, Tokyo (JP)

(72) Inventor: Hidemasa Oshige, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/451,423

(22) Filed: Jun. 25, 2019

(65) Prior Publication Data

US 2020/0012020 A1 Jan. 9, 2020

(30) Foreign Application Priority Data

Jul. 4, 2018 (JP) .................................. 2018-127795

(51) Int. Cl.
  *G02B 5/00* (2006.01)
  *H04N 5/232* (2006.01)
  *H04N 5/225* (2006.01)

(52) U.S. Cl.
  CPC .......... *G02B 5/003* (2013.01); *H04N 5/22525* (2018.08); *H04N 5/23293* (2013.01)

(58) Field of Classification Search
  CPC ........... H04N 5/22525; H04N 5/23293; H04N 5/23212; H04N 5/2251; H04N 5/2252; G03B 13/02; G03B 13/00; G03B 13/06; G03B 13/10; G11B 31/006; G02B 5/003; A61B 3/14
  See application file for complete search history.

(56) References Cited

U.S. PATENT DOCUMENTS

| | | | |
|---|---|---|---|
| 5,600,399 A * | 2/1997 | Yamada | G03B 13/02 396/292 |
| 10,114,218 B2 | 10/2018 | Yamazoe et al. | |
| 2004/0160523 A1* | 8/2004 | Mogi | H04N 5/2252 348/333.07 |
| 2009/0128682 A1* | 5/2009 | He | G03B 3/06 348/345 |
| 2009/0168353 A1* | 7/2009 | Kato | H04N 5/2252 361/697 |

(Continued)

FOREIGN PATENT DOCUMENTS

| JP | 2002-267948 A | 9/2002 |
|---|---|---|
| JP | 2003-161915 A | 6/2003 |

(Continued)

*Primary Examiner* — Chiawei Chen
(74) *Attorney, Agent, or Firm* — Venable LLP

(57) ABSTRACT

An electronic viewfinder is provided. The electronic viewfinder includes a display device including a display portion and a peripheral portion positioned around the display portion, an eyepiece optical system facing the display device, and a light absorbing resin member facing a space between the display device and the eyepiece optical system. In a normal direction with respect to a first surface, of the display device, on a side of the eyepiece optical system, the light absorbing resin member includes an overlap portion that overlaps at least a part of the peripheral portion. A distance from a second surface, facing the eyepiece optical system, of the overlap portion to the first surface in the normal direction is not less than $1/11$ of a focal length of the eyepiece optical system.

18 Claims, 6 Drawing Sheets

(56) References Cited

U.S. PATENT DOCUMENTS

| | | | |
|---|---|---|---|
| 2010/0091375 A1 | 4/2010 | Suzuki | |
| 2010/0104272 A1* | 4/2010 | Ogino | G02B 25/001 396/374 |
| 2012/0081593 A1* | 4/2012 | Nakagawa | G03B 13/04 348/333.06 |
| 2014/0300805 A1* | 10/2014 | Davis | H04N 5/238 348/362 |
| 2014/0376122 A1* | 12/2014 | Lim | G06F 1/1601 359/893 |
| 2015/0280373 A1* | 10/2015 | Furukawa | H01R 13/46 439/578 |
| 2017/0017078 A1* | 1/2017 | Tang | G02B 27/0101 |
| 2017/0315351 A1 | 11/2017 | Yamazoe et al. | |
| 2018/0324334 A1* | 11/2018 | Wippermann | G02B 7/008 |
| 2019/0033599 A1* | 1/2019 | Li | G02B 27/0172 |
| 2019/0212490 A1* | 7/2019 | Tien | G02B 6/0076 |
| 2019/0369304 A1* | 12/2019 | Kim | H04N 5/2254 |

FOREIGN PATENT DOCUMENTS

| | | |
|---|---|---|
| JP | 2003-333386 A | 11/2003 |
| JP | 2008-129042 A | 6/2008 |
| JP | 2016-103008 A | 6/2016 |
| JP | 2017-068181 A | 4/2017 |

* cited by examiner

FIG. 3

| DISTANCE D | 1mm | 1.5mm | 1.8mm | 2.5mm |
|---|---|---|---|---|
| D/f | 1/20 | 1/13.3 | 1/11.1 | 1/8 |
| D/H | 1/7 | 1/4.7 | 1/3.9 | 1/2.8 |
| MELTING | YES | YES | NO | NO |

FOCAL LENGTH f: 20mm

HEIGHT H OF THE MEMBER 200 (DISTANCE FROM THE SURFACE 103 TO THE SURFACE 302 IN THE z DIRECTION) : 7mm

ELECTRONIC VIEWFINDER, IMAGE CAPTURING APPARATUS, AND DISPLAY MODULE

BACKGROUND OF THE INVENTION

Field of the Invention

The present invention relates to an electronic viewfinder, an image capturing apparatus, and a display module.

Description of the Related Art

An electronic viewfinder that is mounted on an image capturing apparatus includes an eyepiece optical system and a display device using a liquid crystal element, an organic electroluminescent element, or the like. In the image capturing apparatus that is equipped with the electronic viewfinder, sunlight can enter the electronic viewfinder when a user is not looking through the electronic viewfinder. If the rays of sunlight that entered the electronic viewfinder are focused via the eyepiece optical system and irradiate a member that is to function as a mask for suppressing external light reflection in a peripheral portion of the display device, there is a possibility that the electronic viewfinder will become damaged because the portion irradiated with the sunlight will melt or the like. In Japanese Patent Laid-Open No. 2016-103008, there is disclosed that, in a head-up display which projects display light from a display device to a projection portion by reflecting the display light by using two concave mirrors, damage to the display device due to the entry of sunlight is prevented by arranging a light-shielding portion for shielding external light between the two concave mirrors. However, the arrangement disclosed in Japanese Patent Laid-Open No. 2016-103008 will increase the size of the electronic viewfinder problematically.

SUMMARY OF THE INVENTION

Some embodiments of the present invention provide a technique advantageous in preventing an electronic viewfinder from being damaged by the incidence of sunlight.

According to some embodiments, an electronic viewfinder that includes a display device including a display portion and a peripheral portion positioned around the display portion, an eyepiece optical system facing the display device, and a light absorbing resin member facing a space between the display device and the eyepiece optical system, wherein in a normal direction with respect to a first surface, of the display device, on a side of the eyepiece optical system, the light absorbing resin member includes an overlap portion that overlaps at least a part of the peripheral portion, and a distance from a second surface, facing the eyepiece optical system, of the overlap portion to the first surface in the normal direction is not less than $1/11$ of a focal length of the eyepiece optical system, is provided.

According to some other embodiment, an electronic viewfinder that includes a display device including a display portion and a peripheral portion positioned around the display portion, an eyepiece optical system facing the display device, a light absorbing resin member facing a space between the display device and the eyepiece optical system, and a light transmitting member, wherein in a normal direction with respect to a first surface, of the display device, on a side of the eyepiece optical system, the light absorbing resin member includes an overlap portion that overlaps at least a part of the peripheral portion, the overlap portion includes a second surface which faces the eyepiece optical system, the light transmitting member includes, in the normal direction, a third surface which faces the first surface and is arranged, so as to cover the first surface, at an end on a side opposite to a side of the first surface of the light absorbing resin member in the normal direction, and a fourth surface which is on a side opposite to the third surface and faces the eyepiece optical system, and a distance from the second surface to the first surface in the normal direction is not less than $1/4$ of a distance from the fourth surface to the first surface in the normal direction, is provided.

According to still other embodiment, an image capturing apparatus comprising an electronic viewfinder, wherein the electronic viewfinder includes a display device including a display portion and a peripheral portion positioned around the display portion, an eyepiece optical system facing the display device, and a light absorbing resin member facing a space between the display device and the eyepiece optical system, wherein in a normal direction with respect to a first surface, of the display device, on a side of the eyepiece optical system, the light absorbing resin member includes an overlap portion that overlaps at least a part of the peripheral portion, and a distance from a second surface, facing the eyepiece optical system, of the overlap portion to the first surface in the normal direction is not less than $1/11$ of a focal length of the eyepiece optical system, is provided.

According to further embodiment, a display module that includes a display device including a display portion and a peripheral portion positioned around the display portion, a light transmitting member arranged at a position facing the display device, and a light absorbing resin member facing a space between the display device and the light transmitting member, wherein in a normal direction with respect to a first surface, of the display device, on a side of the light transmitting member, the light absorbing resin member includes an overlap portion that overlaps at least a part of the peripheral portion, the overlap portion includes a second surface which faces the light transmitting member, the light transmitting member includes, in the normal direction, a third surface which faces the first surface and is arranged, so as to cover the first surface, at an end on a side opposite to a side of the first surface of the light absorbing resin member in the normal direction, and a fourth surface which is on a side opposite to the third surface, and a distance from the second surface to the first surface in the normal direction is not less than $1/4$ of a distance from the fourth surface to the first surface in the normal direction, is provided.

Further features of the present invention will become apparent from the following description of exemplary embodiments (with reference to the attached drawings).

BRIEF DESCRIPTION OF THE DRAWINGS

FIG. 3 is a table showing the presence/absence of the melting of a protruding portion of an electronic viewfinder made as a prototype;

DESCRIPTION OF THE EMBODIMENTS

Figure 1:
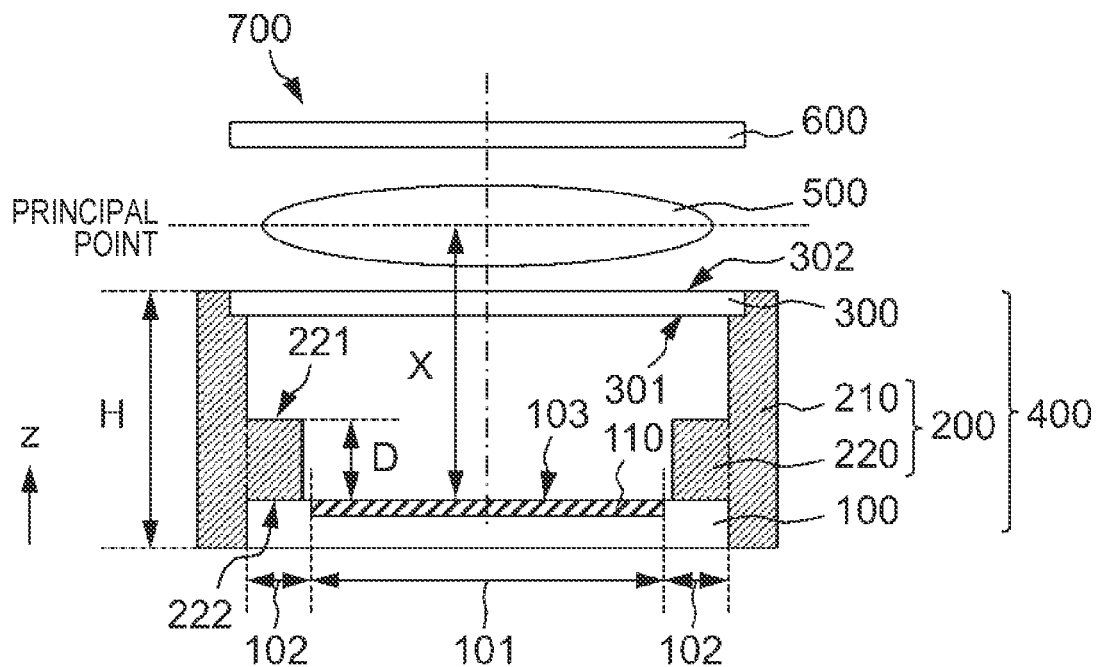
FIG. 1 is a sectional view showing an example of the arrangement of an electronic viewfinder according to an embodiment of the present invention.

Detailed embodiments of an electronic viewfinder according to the present invention will now be described with reference to the accompanying drawings. Note that in the following description and drawings, common reference numerals denote common components throughout a plurality of drawings. Hence, the common components will be described by cross-referencing to the plurality of drawings, and a description of components denoted by common reference numerals will be omitted appropriately.

An electronic viewfinder according to an embodiment of the present invention will be described with reference to FIGS. 1 to 5. FIG. 1 is a schematic sectional view showing the structure of an electronic viewfinder 700 of the present invention. The schematic arrangement of the electronic viewfinder 700 will be described first.

An electronic viewfinder 700 includes an eyepiece optical system 500 and a display module 400 including a display device 100, a light absorbing resin member 200, and a light transmitting member 300. As shown in FIG. 1, the display module 400 including the light absorbing resin member 200 is arranged so as to face a space between the display device 100 and the eyepiece optical system 500. The electronic viewfinder 700 can also include a protection member 600.

The display device 100 includes a surface 103 (first surface) which includes a peripheral portion 102 and a display portion 101 arranged with a display element 110. In the display device 100, the display element 110 such as a liquid crystal element or an organic electroluminescent element is arranged on the surface 103 made of a base material such as silicon or glass. In addition to the display portion 101, a transistor for driving the display element 110, a wiring pattern for supplying electric power to the display element 110, and the like are provided on the display portion 101. The typical shape of the display portion 101 is a quadrilateral in an orthogonal projection with respect to the surface 103, and a dimension W (diagonal length) of the display portion 101 in such a case is, for example, 2.54 mm to 25.4 mm (0.1 in to 1.0 in) and is, for example, 5 mm to 20 mm. A wiring pattern, a circuit for driving the display element 110, an external connection terminal for electrically connecting to the outside of the display module 400, and the like are arranged in the peripheral portion 102. The external connection terminal and a wiring substrate (not shown) that electrically connects to the outside of the display module 400 are joined via a joining member (not shown) such as a bump, anisotropic conductive resin, or the like. A light-transmitting cover member that is made of glass or the like may be arranged, as needed, on the display device 100 at regions other than each connecting portion with the wiring substrate.

The light absorbing resin member 200 includes a side wall portion 210 one end of which surrounds the outer edge of the surface 103 of the display device 100 and is arranged along a z direction (direction of a normal line) perpendicular to the surface 103. Furthermore, the light absorbing resin member 200 includes an overlap portion 220 that overlaps at least a part of the peripheral portion 102 in the z direction with respect to the surface 103 of the display device 100. As shown in FIG. 1, the side wall portion 210 can be arranged outside the outer edge of the display device 100 in an orthogonal projection with respect to the surface 103 of the display device 100. However, the present invention is not limited to this, and the side wall portion 210 may cover a part of the display device 100. In contrast, the overlap portion 220 protrudes, so as to cover a part of the display device 100, from a part of the side wall portion 210 toward the center of the display device 100 in a direction that intersects the z direction.

The side wall portion 210 and the overlap portion 220 may be integrally formed from the same material. The side wall portion 210 and the overlap portion 220 may also be formed separately and joined together by using a joining member such as an adhesive. In a case in which a wiring substrate such as a flexible printed circuit (FPC) has been joined to the peripheral portion 102 of the display device 100, the wiring substrate may form a step in the peripheral portion 102. In order to eliminate the step formed by this wiring substrate, a counter bore portion (concave portion) may be arranged in the light absorbing resin member 200 so that the surface 103 of the display device 100 abuts against the overlap portion 220. The light absorbing resin member 200 can be formed from a thermoplastic resin such as polyethylene terephthalate (PET), modified polyphenylene ether (PPE), a liquid crystal polymer (LCP), or the like. A more significant effect of this embodiment can be obtained in a case in which the light absorbing resin member 200 is made of a thermoplastic resin than a case in which the light absorbing resin member is made of a thermosetting resin since deformation of the light absorbing resin member 200 due to temperature rise occurs more easily in the case in which the light absorbing resin member is made of a thermoplastic resin. This embodiment is effective since deformation of the light absorbing resin member 200 due to temperature rise occurs more easily in a case in which the light absorbing resin member 200 has a heat resistance temperature of 200° C. or less than in a case in which the light absorbing resin member 200 has a heat resistance temperature higher than 200° C. Note that the heat resistance temperature of a typical liquid crystal polymer (LCP) is 250° C. or more. A resin whose heat resistance temperature is 200° C. or less is, for example, an ABS resin, a PC resin, a PP resin, a PET resin, a PPE resin, an epoxy resin, or a polyamide resin. The heat resistance temperature of a PPE resin can be 100° C. or less. A filler such as glass fiber may be added to the material of the resin to improve the mechanical strength of the light absorbing resin member 200. In addition, to prevent the degradation of the display quality of the electronic viewfinder 700 due to light emitted from the display element 110 and external light being reflected by the surface of the light absorbing resin member 200, a black pigment or the like can be added to the resin forming the light absorbing resin member 200. Since a temperature rise due to light occurs more easily in a case in which the light absorbing resin member 200 is black than in a case in which the resin member is white, a more significant effect of this embodiment can be obtained in a case in which the light absorbing resin member is black. The overlap portion 220 can function as a mask for suppressing external light reflection on the peripheral portion 102. The overlap portion 220 can also perform the role of determining the position and the height of the light absorbing resin member 200 with respect to the display device 100.

The light transmitting member 300 is arranged, so as to cover the surface 103 of the display device 100, at the end on a side opposite to the side of the surface 103 of the display device 100 of the light absorbing resin member 200 in the z direction. The light transmitting member 300 includes a surface 301 (third surface) which faces the surface 103 of the display device 100 and a surface 302 (fourth surface) which is on the opposite side of the surface 301 and faces the eyepiece optical system 500. Glass or plastic such as acrylic can be used as the light transmitting member 300. The light absorbing resin member 200 surrounding the periphery of the display device 100 and the light transmitting member 300 that transmits light suppress dust and dirt from attaching to the display portion 101 of the display device 100. Also, as shown in FIG. 1, the display device 100 is arranged on one end and the light transmitting member 300 is arranged on the other end of the light absorbing resin member 200 in the z direction. Hence, in this embodiment, the light absorbing resin member 200 is arranged so as to face the space between the display device 100 and the light transmitting member 300.

The eyepiece optical system 500 enlarges an image displayed on the display portion 101 of the display device 100. The eyepiece optical system 500 can be a unit integrating a plurality of lenses. A mechanism can be arranged to perform diopter adjustment in correspondence with the vision of an observer by moving the eyepiece optical system 500 in the z direction as the optical-axis direction to change the interval of the eyepiece optical system 500 with respect to the display device 100.

The protection member 600 is arranged to prevent damage to the eyepiece optical system 500 and to improve the dustproof and drip-proof performance in the electronic viewfinder 700. The protection member 600 may be set as an eyepiece portion. A cover member which is formed from rubber or plastic and called an eyecup for suppressing the entry of excess external light from the eyepiece portion may be arranged on the protection member 600, and the cover member may be set to function as the eyepiece portion.

The manufacturing method of the electronic viewfinder 700 according to the embodiment will be described next. A case using an organic electroluminescent display element as the display element 110 will be described here. That is, a case in which the display device 100 is an organic electroluminescent display device will be described.

First, a semiconductor element such as a transistor, a capacitor, or the like for driving the display element 110 is formed on the side of the surface 103 of the substrate using a semiconductor such as silicon. An insulating layer, a wiring pattern layer, and the like are sequentially formed on the semiconductor element, and an external connection terminal and the like are formed simultaneously on the peripheral portion 102 outside the display portion 101 of the substrate. Next, a pixel electrode electrically connected to the wiring pattern through a via provided on the insulating layer is arranged for each pixel. Each pixel electrode is formed on the display portion 101 of the surface 103 of the substrate. A white organic electroluminescent light-emitting layer is formed on the pixel electrodes, and a transparent electrode, a sealing layer, and a color filter are stacked and formed on the organic electroluminescent light-emitting layer in that order. Subsequently, the display device 100 can be completed when a flexible printed circuit board (FPC) for electrically connecting the display device 100 to an external power supply is joined, via an anisotropic conductive resin, to the external connection terminal arranged in the display device 100.

The light absorbing resin member 200 is formed by using, for example, an injection molding method. In this embodiment, the side wall portion 210 and the overlap portion 220 of the light absorbing resin member 200 are integrally molded by using a liquid crystal polymer as the resin for forming the light absorbing resin member 200. For example, a resin temperature of 350° C., a mold temperature of 130° C., and an injection pressure of 100 MPa can be set as the molding conditions.

Next, the surface 103 of the display device 100 is covered by the light absorbing resin member 200, and the surface 103 of the display device 100 and the overlap portion 220 of the light absorbing resin member 200 are made to abut against each other. Subsequently, an epoxy-based adhesive is injected to the gap between the display device 100 and the light absorbing resin member 200 to join the display device 100 and the light absorbing resin member 200. Next, on the end on the side opposite to the end where the display device 100 of the light absorbing resin member 200 is arranged, a glass substrate is installed as the light transmitting member 300 and adhered so as to face the surface 103 of the display device 100 by using an epoxy-based adhesive. The display module 400 is completed by undergoing the processes described above.

Next, the eyepiece optical system 500 is installed on the display module 400. Here, in this specification, an "upward" direction indicates the direction of an arrow in the z direction shown in FIG. 1. Hence, in this specification, it can be expressed that the eyepiece optical system 500 is arranged "upward" above the display module 400. In this embodiment, the eyepiece optical system is an eyepiece lens unit formed by combining three lenses. In addition, height adjustment with the display module 400 is performed so that the distance from surface 103 of the display device 100 to the eyepiece optical system 500 in the z direction will be almost equal to the focal length of the eyepiece optical system 500.

Next, the electronic viewfinder 700 according to this embodiment shown in FIG. 1 is completed when the light-transmitting protection member 600 is set above the eyepiece optical system 500. In this embodiment, the eyepiece optical system 500 and the protection member 600 are supported above the display module 400 by a supporting member (not shown) separate from the display module 400. However, the present invention is not limited to this arrangement, and the eyepiece optical system 500 and the protection member 600 may be supported by the side wall portion 210 of the display module 400.

Figure 2A:
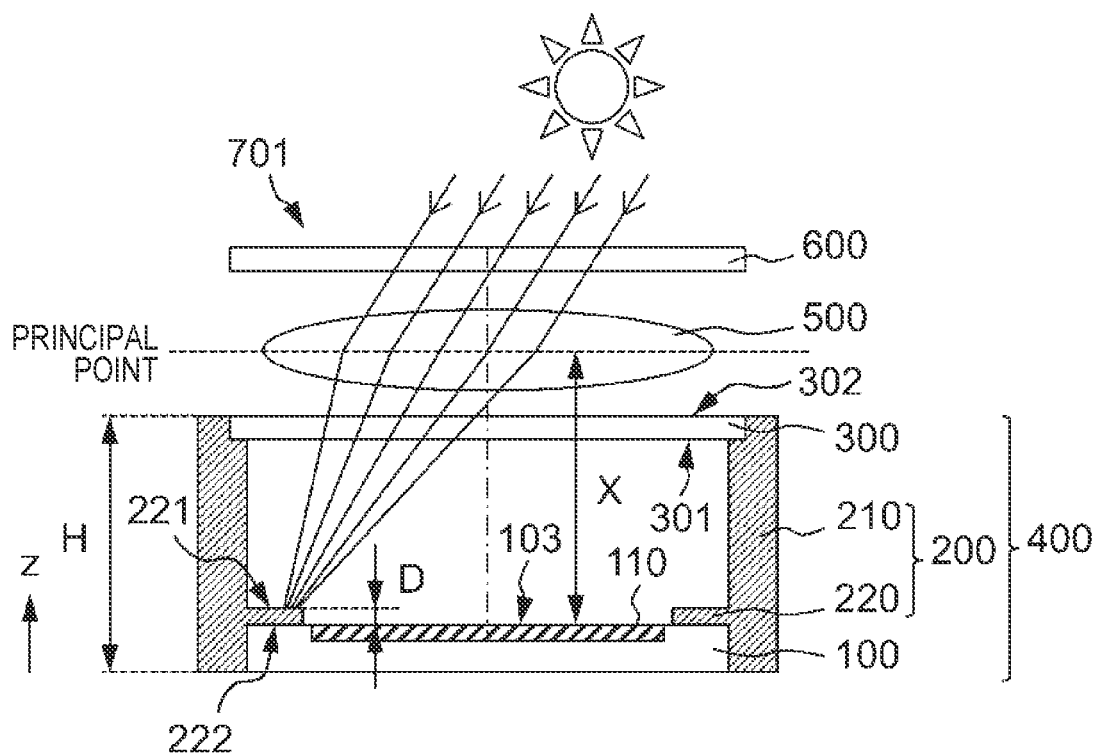
FIGS. 2A to 2C are views for explaining light focusing states obtained when sunlight has entered the electronic viewfinder of FIG. 1 and an electronic viewfinder of a comparative example.
Figure 2B:
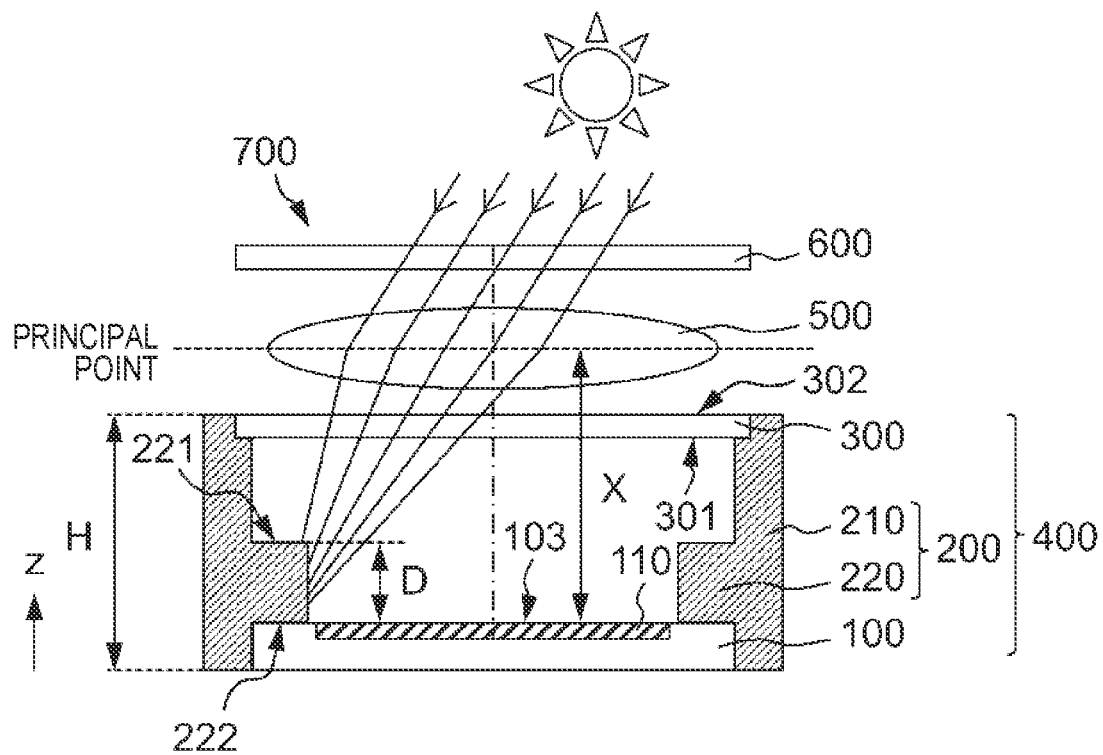
Figure 2C:
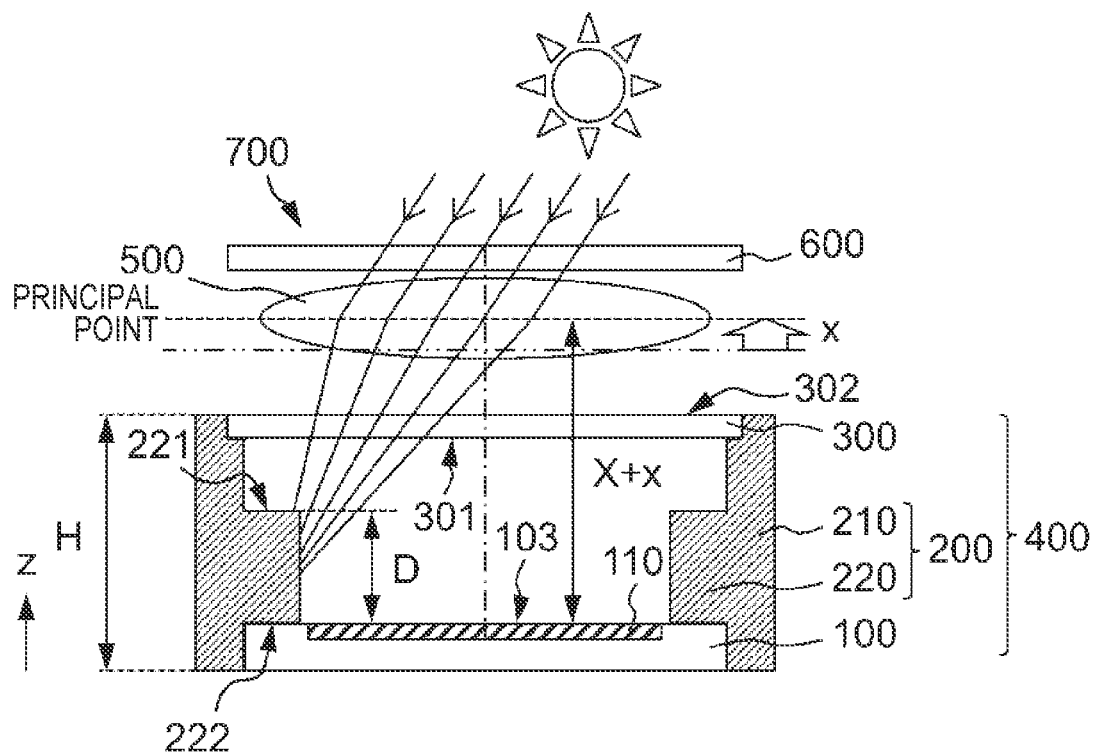

A distance D from a surface 221 (second surface), which is an eyepiece-optical-system facing surface of the overlap portion 220 of the light absorbing resin member 200, to the surface 103 of the display device 100 in the z direction will be described in detail here. For the sake of display quality improvement and miniaturization of the electronic viewfinder 700, the distance D is set, for example, to be smaller than the dimension W (D<W) in the diagonal direction of the quadrilateral display portion 101. FIGS. 2A to 2C are schematic views each showing a light focusing state when the sunlight has entered the display module 400 from the eyepiece optical system 500. FIG. 2A shows a case in which the distance between the surface 221 of the overlap portion 220 and the surface 103 of the display device 100 is small, and FIG. 2B shows a case in which the distance between the surface 221 of the overlap portion 220 and the surface 103 of the display device 100 is large.

In this case, the principal point of the eyepiece optical system 500 shown in each of FIGS. 1 to 2C is an intersection point of lines extending from a light beam that enters the eyepiece optical system 500 and a light beam that exits from the eyepiece optical system 500 to the side of the display module 400. Although, strictly speaking, each light beam that passes through the eyepiece optical system 500 will refract at the entry to and the exit from each lens of the eyepiece optical system 500, each light beam is described here as if it is refracted at the principal point for the sake of descriptive convenience. In addition, assume that a distance X denotes a distance from the principal point of the eyepiece optical system 500 to the surface 103 of the display device 100 in the z direction. Furthermore, assume that the rays of sunlight that passed through the eyepiece optical system 500 are focused at a focal point and that a focal length f denotes the focal length of the eyepiece optical system 500.

As shown by an electronic viewfinder 701 according to a comparative example shown in FIG. 2A, in a case in which the focal length f is almost equal to the distance X and the distance D is small, the surface 221 of the overlap portion 220 is arranged closer to the focal point and the surface of the overlap portion 220 may melt due to the focused rays of sunlight. On the other hand, in the manner of the electronic viewfinder 700 according to this embodiment shown in FIG. 2B, even in a case in which the focal length f is almost equal to the distance X, the surface 221 of the overlap portion 220 can be separated upward from the focal point by increasing the distance D. As a result, it will weaken the focusing of rays of sunlight on the surface 221 of the overlap portion 220 and suppress the melting of the surface of the overlap portion 220. In a case in which the eyepiece optical system 500 has a diopter adjustment function, the distance X between the eyepiece optical system 500 and the surface 103 of the display device 100 will change (shift). In a case in which the distance X is changed in a direction (toward the lower side of the drawing) that decreases the distance X, the possibility of the light absorbing resin member 200 melting is low since the focal point will be apart from the surface 221 of the overlap portion 220. On the other hand, consider a case in which the distance X is changed in a direction (toward the upper side of the drawing) that increases the distance X, that is, a case in which the eyepiece optical system 500 is arranged so that the distance from the surface 103 of the display device 100 to the principal point of the eyepiece optical system 500 in the z direction will be movable between a position of f+x (assume that x>0 in this case) to at least the position of f. In this case, the focal point will become closer to the surface 221 of the overlap portion 220. Hence, in a case in which diopter adjustment is to be performed as shown in FIG. 2C, the distance D may be increased in consideration of the shifting width of the eyepiece optical system 500.

An electronic viewfinder made as a prototype by changing the distance D will be described next. The dimension W (diagonal length) of the display portion 101 of the prototype electronic viewfinder is set to 12.7 mm (0.5 in). Also, by using the eyepiece optical system 500 having the focal length f equal to 20 mm, the distance X from the principal point of the eyepiece optical system 500 to the surface 103 of the display device 100 in the z direction is set to 20 mm. In addition, in the prototype electronic viewfinder, a height H of the side wall portion 210 of the light absorbing resin member 200 formed by a liquid crystal polymer in the z direction is set to 7 mm. The height H of the side wall portion 210 of the light absorbing resin member 200 in this case is, in other words, the distance from the surface 302 of the light transmitting member 300 to the surface 103 of the display device 100 in the z direction when the display device 100 is arranged at one end and the light transmitting member 300 is arranged at the other end of the light absorbing resin member 200 in the z direction as shown in this embodiment. At this time, the side wall portion 210 need not have a structure covering the entire side surface of the display device 100 as shown in FIG. 1, and it may be set so that the side wall portion 210 will cover only a part on the side of the surface 103 of the display device 100. To achieve the display quality improvement and miniaturization of the electronic viewfinder 700, the height H of the side wall portion 210 in the z direction is set to be smaller than the dimension W (diagonal length) of the display portion 101 (H<W). Since the overlap portion 220 will protrude from the side wall portion 210, the distance D will be set smaller than the height H (D<H).

FIG. 3 is a table showing the results obtained from evaluating whether the melting of the overlap portion 220 has occurred by performing a test in which the sunlight is made to enter the display module 400 through the eyepiece optical system 500 in the prototype electronic viewfinder. As shown in FIG. 3, melting of the surface of the overlap portion 220 is not confirmed when the distance D from the surface 221 of the overlap portion 220 to the surface 103 of the display device 100 in the z direction is equal to or more than 1.8 mm. That is, in terms of the relationship between the focal length f and the distance D, it is preferable for the distance D from the surface 221, facing the eyepiece optical system 500, of the overlap portion 220 to the surface 103 of the display device 100 to be equal to or more than $^{1}\!/_{11}$ of the focal length f of the eyepiece optical system 500. Also, in terms of the relationship with the height H (in this embodiment, the height H corresponds to the distance from the surface 302 of the light transmitting member 300 to the surface 103 of the display device 100 in the z direction as described above) of the side wall portion 210 of the light absorbing resin member 200, it is preferable for the distance D to be equal to or more than ¼ of the height H. In addition, at this time, it may be arranged so that the surface 221 of the overlap portion 220 is spaced apart from the surface 301 of the light transmitting member 300 as shown in FIG. 1. In other words, the overlap portion 220 need not directly support the light transmitting member 300. For example, the surface 221 of the overlap portion 220 and the surface 301 of the light transmitting member 300 may be spaced apart from each other so that the distance D is equal to or less than $^{10}\!/_{11}$ of the focal length f of the eyepiece optical system 500. Furthermore, the surface 221 of the overlap portion 220 and the surface 301 of the light transmitting member 300 may be spaced apart from each other by setting the distance D from the surface 221 of the overlap portion 220 to the surface 103 of the display device 100 in the z direction to be equal to or less than ¾ of the height H.

A case in which the electronic viewfinder 700 has a diopter adjustment function as described above, that is, a case in which the principal point of the eyepiece optical system 500 is moved in the z direction by diopter adjustment will also be considered. For example, consider a case in which the distance from the surface 103 of the display device 100 to the principal point of the eyepiece optical system 500 in the z direction is shifted ±x (for example, 1 mm) with respect to the focal length f In this case, it is preferable for the distance D to be equal to or more than f/11+x in consideration of a case in which the distance from the surface 103 of the display device 100 to the principal point of the eyepiece optical system 500 is increased. In addition, in terms of the relationship with the height H (in this embodiment, the height H corresponds to the distance from the surface 302 of the light transmitting member 300 to the surface 103 of the display device 100 in the z direction as described above) of the side wall portion 210 of the light absorbing resin member 200, it is preferable for the distance D to be equal to or more than H/4+x.

It is difficult to apply the structure disclosed in Japanese Patent Laid-Open NO. 2016-103008 to the electronic viewfinder 700, which has only a small space (approximately 5 to 30 mm) between the display portion 101 and the eyepiece optical system 500, to avoid the melting of the overlap portion 220 of the light absorbing resin member 200. Also, if a high heat resistant member is used for the overlap portion 220 and the overlap portion is arranged separately from the side wall portion 210 as shown in Japanese Patent Laid-Open NO. 2016-103008, it may increase the component cost and the processing cost. In addition, for example, although it is possible to consider a method of detecting that the user is not looking through the electronic viewfinder and blocking the sunlight by arranging a shutter mechanism in the electronic viewfinder, such a method will increase the size and the cost of the electronic viewfinder. In contrast, in this embodiment, the surface of the overlap portion 220 can be set apart from the focal point of the eyepiece optical system 500 by increasing the distance D from the surface 221 of the overlap portion 220 to the surface 103 of the display device 100. As a result, it is possible to prevent the melting of the light absorbing resin member 200. Furthermore, since the light absorbing resin member 200 has a comparatively simple structure, it is possible to suppress the increase in the size as well as the manufacturing cost of the electronic viewfinder.

The electronic viewfinder 700 according to this embodiment is not limited to the structure shown in FIG. 1, and various kinds of modifications are possible. Modifications of the display module 400 of the electronic viewfinder 700 will be described with reference to FIGS. 4A to 4D. FIGS. 4A to 4D are schematic sectional views of the display module 400 of the electronic viewfinder 700.

Figure 4A:
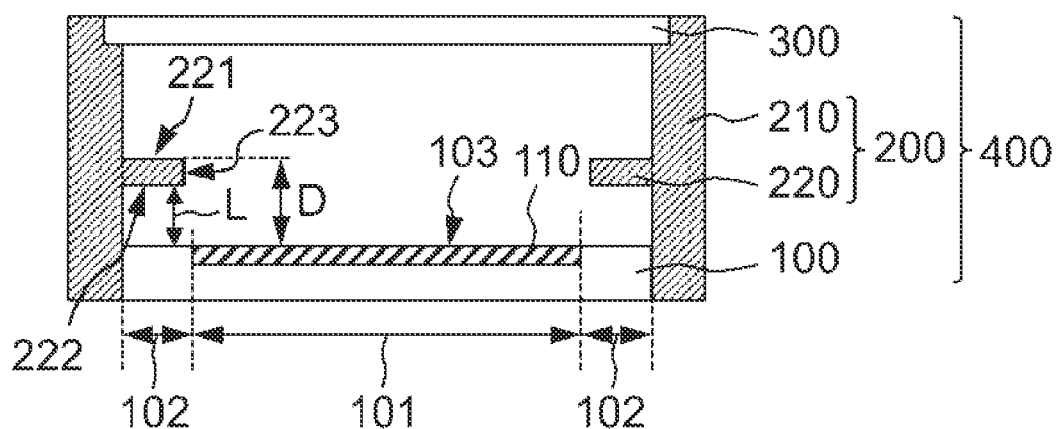
FIGS. 4A to 4D are sectional views showing a modification of a display module of the electronic viewfinder of FIG. 1.

In the display module 400 shown in FIG. 1, the overlap portion 220 is arranged so that at least a part (for example, a portion other than the counter bore portion described above) of a surface 222 (fifth surface) on the side facing the display device 100 will abut against the surface 103 of the display device 100. On the other hand, as shown in FIG. 4A, the overlap portion 220 may be arranged apart from the surface 103 of the display device 100 in the z direction. In this case, a distance L from the surface 222 of the overlap portion 220 to the surface 103 of the display device 100 in the z direction may be equal to or more than ¼ of the distance D from the surface 221 of the overlap portion 220 to the surface 103 of the display device 100 in the z direction. In addition, the distance L from the surface 222 of the overlap portion 220 to the surface 103 of the display device 100 in the z direction may be equal to or more than ½ of the distance D from the surface 221 of the overlap portion 220 to the surface 103 of the display device 100 in the z direction. In other words, the overlap portion 220 need not abut against the display device 100. In a case in which a side surface 223 of the overlap portion 220 is arranged adjacent to the surface 103 of the display device 100, the display light from the display portion 101 may be reflected by the side surface 223 and become visible for the user. Hence, by arranging the surface 222 of the overlap portion 220 to be spaced apart from the surface 103 of the display device 100, the eyepiece optical system 500 will be out of focus even when the display light is reflected by the side surface 223 of the overlap portion 220, and thus it is possible to suppress the reflected light from becoming visible. In this case as well, the distance D from the surface 221 of the overlap portion 220 to the surface 103 of the display device 100 can be set in the same manner as described above (for example, the distance D is set to be equal to or more than 1/11 of the focal length f). It is possible to prevent the melting of the light absorbing resin member 200 due to the entry of the sunlight by the structure shown in FIG. 4A. However, in the case of the structure shown in FIG. 4A, there is a concern that the display quality will degrade due to the reflection of external light in the peripheral portion 102 of the display device 100. Therefore, the reflection of external light in the peripheral portion 102 can be suppressed by forming a light absorbing member on the surface of the peripheral portion 102 of the display device 100 by using, for example, a black resin.

Figure 4B:
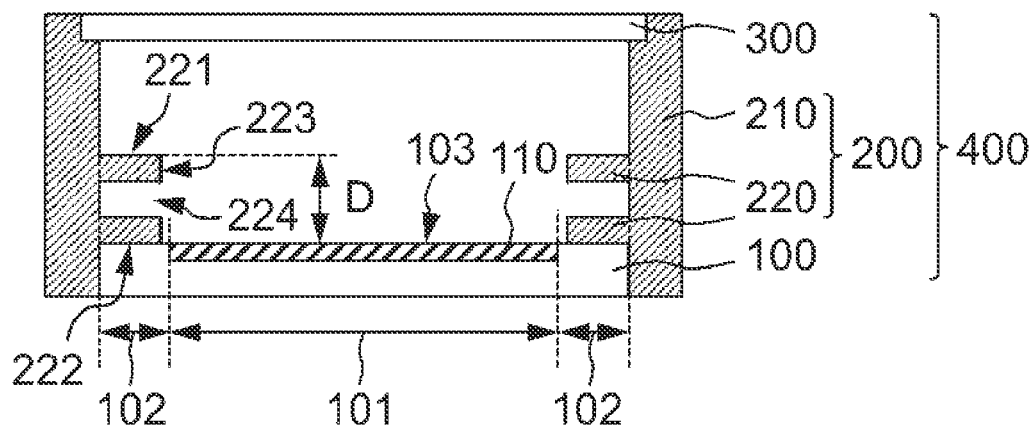

Also, as shown in FIG. 4B, the overlap portion 220 may include the surface 222 (fifth surface) arranged on the side of surface 103 of the display device 100 opposite to the surface 221 and the side surface 223 arranged between the surface 221 and the surface 222, and a concave portion 224 may be arranged on the side surface 223. In other words, the overlap portion 220 may be divided into a plurality of stages in the manner of an upper stage (on the upper side of FIG. 4B) and a lower stage (on the lower side of FIG. 4B). In this case as well, it is sufficient to set the distance D from the surface 221, facing the eyepiece optical system 500, of the overlap portion 220 to the surface 103 of the display device 100 in the same manner as described above. In addition, in this case, the distance of the concave portion 224 in the z direction may be made smaller so that the sunlight will not enter the surface of the overlap portion 220 or a structure in which, in the overlap portion 220, the protruding portion on the lower stage side is hidden by the protruding portion on the upper stage side which is closer to the light transmitting member 300 may be arranged. It is possible to prevent the melting of the light absorbing resin member 200 due to the entry of sunlight by the structure shown in FIG. 4B.

Figure 4C:
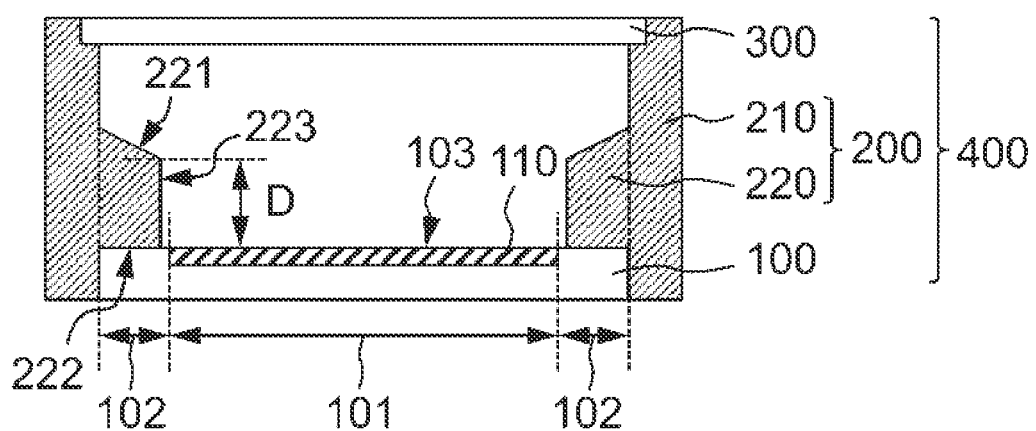

In addition, the surface 221 of the overlap portion 220 need not always be parallel to the surface 103 of the display device 100. The surface 221 of the overlap portion 220 may be tilted as shown in FIG. 4C. For example, as the surface 221 of the overlap portion 220 becomes closer to the center of the display device 100, in other words, as the surface 221 of the overlap portion is set apart from the side wall portion 210, the distance from the surface 221 to the surface 103 in the z direction may be decreased continuously or stepwise as shown in FIG. 4C. In this case, the distance D from a portion of the surface 221 of the overlap portion 220, which is closest to the surface 103 of the display device 100, to the surface 103 of the display device 100 can be set in the same manner as described above. It is also possible to prevent the melting of the light absorbing resin member 200 due to the entry of sunlight by the structure shown in FIG. 4C.

Figure 4D:
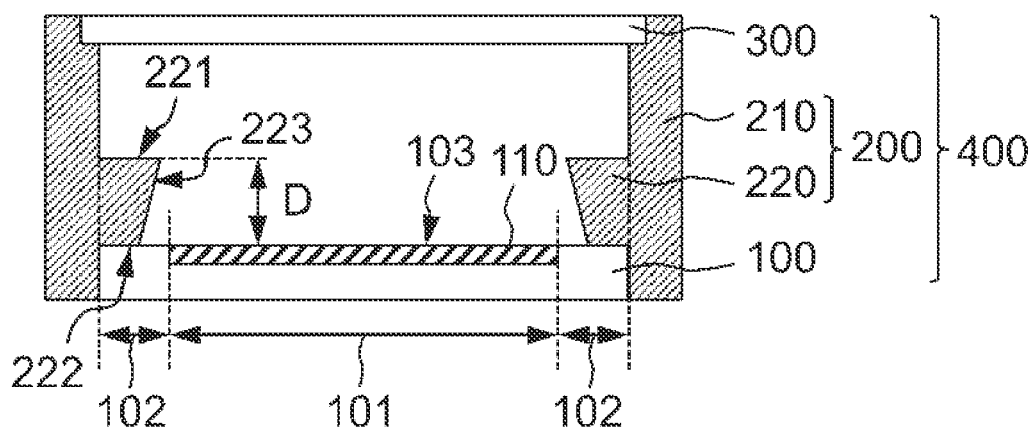

In addition, the side surface 223 of the overlap portion 220 need not always be parallel to the z direction. As shown in FIG. 4D, the side surface 223 can be tilted in a tangential direction of the surface 103 so as to become closer to the center of the display device 100 continuously or stepwise as the distance from the side surface 223 of the overlap portion 220 to the surface 103 of the display device 100 increases. In other words, the side surface 223 of the overlap portion 220 may have a reverse tapered shape. The influence of the display light reflected by the side surface 223 of the overlap portion 220 can be suppressed by the structure shown in FIG. 4D. Also, in the structure shown in FIG. 4D as well, the distance D from the surface 221 of the overlap portion 220 from the surface 103 of the display device 100 can be set in the same manner as described above. It is also possible to prevent the melting of the light absorbing resin member 200 due to the entry of sunlight by the structure shown in FIG. 4D.

The modifications of the overlap portion 220 shown in FIGS. 4A to 4D may be combined. For example, in the overlap portion 220 shown in FIGS. 4C and 4D, the surface 222 of the overlap portion 220 may be spaced apart from the surface 103 of the display device 100 in the manner of the overlap portion 220 shown in FIG. 4A. Also, for example, in the overlap portion 220 shown in FIG. 4C, the concave portion 224 may be arranged in the manner of the overlap portion 220 shown in FIG. 4B.

Figure 5:
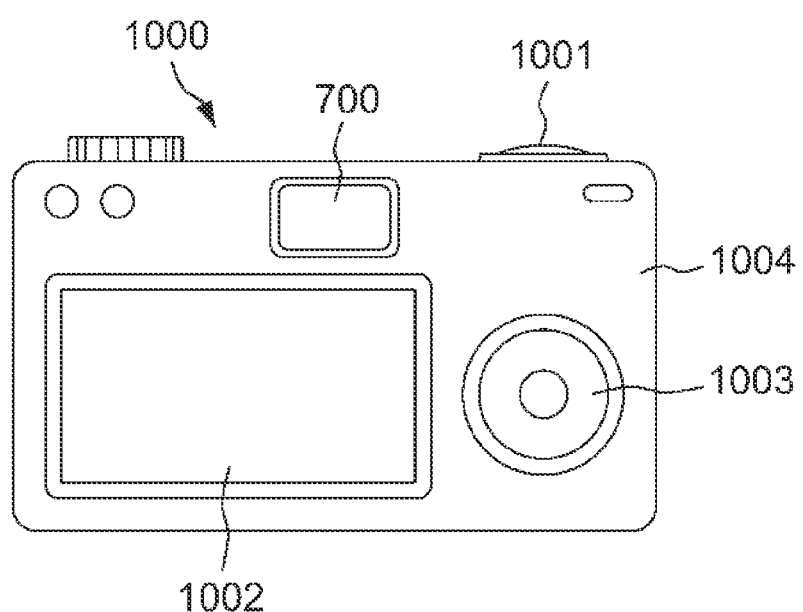
FIG. 5 is a view showing an example of the arrangement of an image capturing apparatus using the electronic viewfinder of FIG. 1.

FIG. 5 is a schematic view showing an example of an image capturing apparatus that includes the electronic viewfinder 700 according to this embodiment. An image capturing apparatus 1000 includes the electronic viewfinder 700 described above, a shutter button 1001, a back display 1002, an operation portion 1003, and a housing 1004. The display portion 101 of the electronic viewfinder 700 may display not only an image to be captured, but also environment information, image capturing instructions, and the like. The environment information may be pieces of information such as the intensity of external light, the direction of external light, the speed of the movement of an object, the possibility of the object being blocked by an obstacle, and the like.

In addition, the image capturing apparatus 1000 includes an optical unit (not shown). This optical unit has a plurality of lenses, and forms an image of light having passed through the optical unit on an image capturing element (not shown) that is accommodated in the housing 1004 and receives the light. The focal points of the plurality of lenses can be adjusted by adjusting the relative positions. This operation can also be performed automatically. An image captured by the image capturing element can be displayed on the display portion 101 of the electronic viewfinder 700.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-127795, filed Jul. 4, 2018, which is hereby incorporated by reference herein in its entirety.

What is claimed is:

1. An electronic viewfinder that includes a display device including a display portion and a peripheral portion positioned around the display portion, an eyepiece optical system facing the display device, and a light absorbing resin member facing a space between the display device and the eyepiece optical system,
wherein in a normal direction with respect to a first surface, of the display device, on a side of the eyepiece optical system, the light absorbing resin member includes an overlap portion that overlaps at least a part of the peripheral portion, and
a distance from a second surface, facing the eyepiece optical system, of the overlap portion to the first surface in the normal direction is not less than $1/11$ of a focal length of the eyepiece optical system.

2. The electronic viewfinder according to claim 1, wherein the distance from the second surface to the first surface in the normal direction is not more than $10/11$ of the focal length.

3. The electronic viewfinder according to claim 1, wherein in the normal direction, a light transmitting member is arranged, so as to cover the first surface, at an end on a side opposite to the side of the first surface of the light absorbing resin member,
the light transmitting member includes a third surface which faces the first surface and a fourth surface which is on a side opposite to the third surface and faces the eyepiece optical system, and
the distance from the second surface to the first surface in the normal direction is not less than $1/4$ of a distance from the fourth surface to the first surface in the normal direction.

4. The electronic viewfinder according to claim 1, wherein letting f be the focal length of the eyepiece optical system, the eyepiece optical system is arranged so that a distance from the first surface to a principal point of the eyepiece optical system in the normal direction will be movable between a position of f+x (x>0) and at least a position of f, and the distance from the second surface to the first surface in the normal direction is not less than f/11+x.

5. The electronic viewfinder according to claim 1, wherein a shape of the display portion is a quadrilateral in an orthogonal projection with respect to the first surface, and
the distance from the second surface to the first surface in the normal direction is smaller than a dimension in a diagonal direction of the display portion.

6. The electronic viewfinder according to claim 1, wherein a concave portion is arranged on a side surface of the overlap portion.

7. The electronic viewfinder according to claim 1, wherein a side surface of the overlap portion is tilted in a tangential direction of the first surface so as to become closer to the center of the display device continuously or stepwise as the distance from the side surface of the overlap portion to the first surface increases.

8. The electronic viewfinder according to claim 1, wherein the display device is an organic electroluminescent display device.

9. The electronic viewfinder according to claim 1, wherein at least a part of the overlap portion is arranged to abut against the first surface.

10. The electronic viewfinder according to claim 1, wherein the overlap portion is arranged to be apart from the first surface in the normal direction.

11. The electronic viewfinder according to claim 10, wherein a distance from a fifth surface, which is arranged on the side of the first surface opposite to the second surface of the overlap portion, to the first surface in the normal direction is not less than $1/2$ of the distance from the second surface to the first surface in the normal direction.

12. The electronic viewfinder according to claim 1, wherein as the second surface becomes closer to the center of the display device, the distance from the second surface to the first surface in the normal direction decreases continuously or stepwise.

13. An electronic viewfinder that includes a display device including a display portion and a peripheral portion positioned around the display portion, an eyepiece optical system facing the display device, a light absorbing resin member facing a space between the display device and the eyepiece optical system, and a light transmitting member,
wherein in a normal direction with respect to a first surface, of the display device, on a side of the eyepiece optical system, the light absorbing resin member includes an overlap portion that overlaps at least a part of the peripheral portion,
the overlap portion includes a second surface which faces the eyepiece optical system,
the light transmitting member includes, in the normal direction, a third surface which faces the first surface and is arranged, so as to cover the first surface, at an end on a side opposite to a side of the first surface of the light absorbing resin member in the normal direction, and a fourth surface which is on a side opposite to the third surface and faces the eyepiece optical system, and a distance from the second surface to the first surface in the normal direction is not less than ¼ of a distance from the fourth surface to the first surface in the normal direction.

14. The electronic viewfinder according to claim 13, wherein the distance from the second surface to the first surface in the normal direction is not more than ¾ of the distance from the fourth surface to the first surface in the normal direction.

15. The electronic viewfinder according to claim 13, wherein the distance from the second surface to the first surface in the normal direction is not less than 1/11 of a focal length of the eyepiece optical system.

16. The electronic viewfinder according to claim 13, wherein letting f be a focal length of the eyepiece optical system, the eyepiece optical system is arranged so that a distance from the first surface to a principal point of the eyepiece optical system in the normal direction will be movable between a position of f+x (x>0) and at least a position of f, and letting H be the distance from the fourth surface to the first surface in the normal direction, the distance from the second surface to the first surface in the normal direction is not less than H/4+x.

17. An image capturing apparatus comprising an electronic viewfinder, wherein the electronic viewfinder includes a display device including a display portion and a peripheral portion positioned around the display portion, an eyepiece optical system facing the display device, and a light absorbing resin member facing a space between the display device and the eyepiece optical system, wherein in a normal direction with respect to a first surface, of the display device, on a side of the eyepiece optical system, the light absorbing resin member includes an overlap portion that overlaps at least a part of the peripheral portion, and a distance from a second surface, facing the eyepiece optical system, of the overlap portion to the first surface in the normal direction is not less than 1/11 of a focal length of the eyepiece optical system.

18. A display module that includes a display device including a display portion and a peripheral portion positioned around the display portion, a light transmitting member arranged at a position facing the display device, and a light absorbing resin member facing a space between the display device and the light transmitting member, wherein in a normal direction with respect to a first surface, of the display device, on a side of the light transmitting member, the light absorbing resin member includes an overlap portion that overlaps at least a part of the peripheral portion, the overlap portion includes a second surface which faces the light transmitting member, the light transmitting member includes, in the normal direction, a third surface which faces the first surface and is arranged, so as to cover the first surface, at an end on a side opposite to a side of the first surface of the light absorbing resin member in the normal direction, and a fourth surface which is on a side opposite to the third surface, and a distance from the second surface to the first surface in the normal direction is not less than ¼ of a distance from the fourth surface to the first surface in the normal direction.

* * * * *